Figure 1:
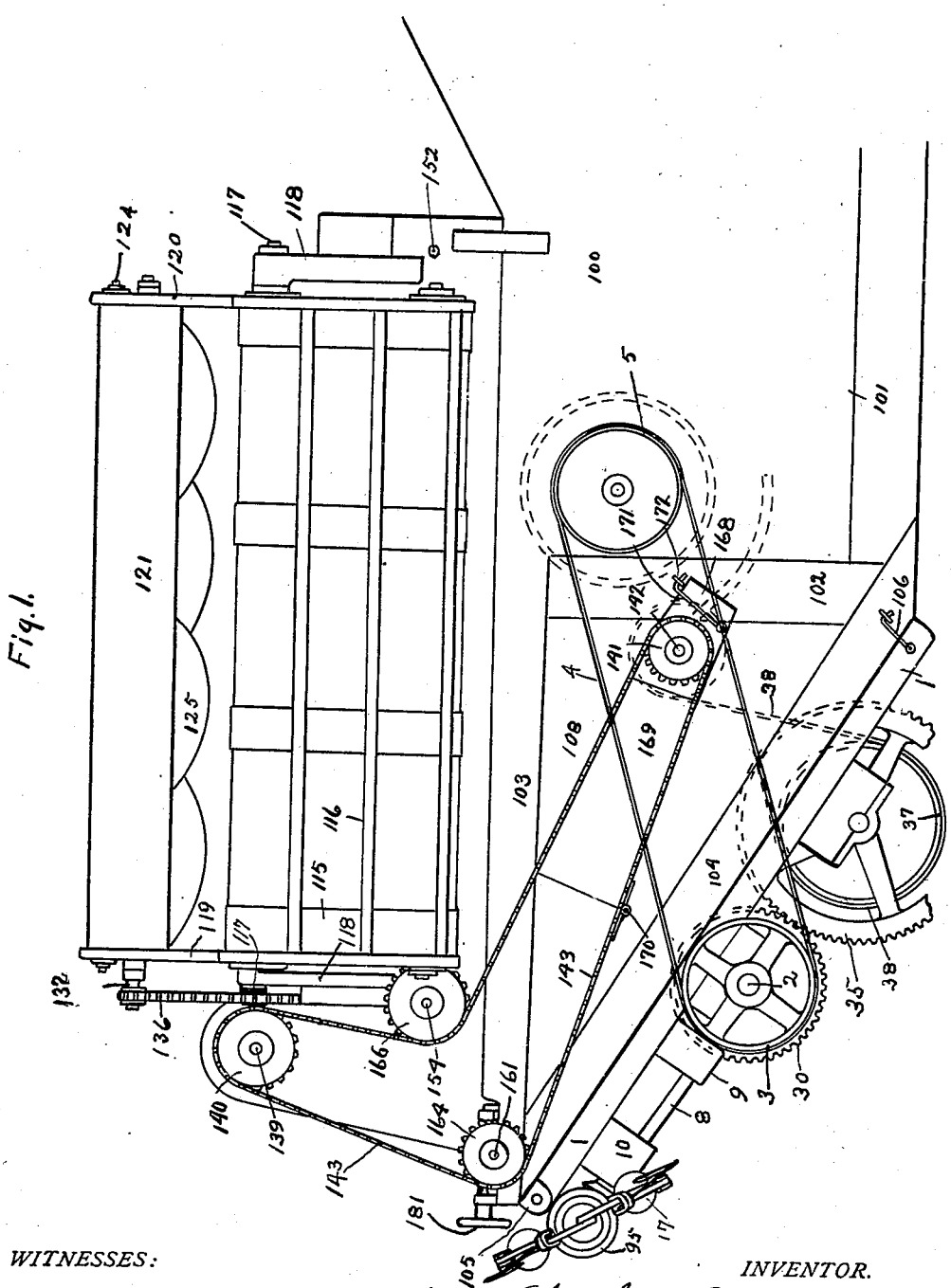

No. 665,716. Patented Jan. 8, 1901.
A. AMANNS.
THRESHING MACHINE.
(Application filed May 6, 1899.)

(No Model.) 7 Sheets—Sheet 1.

WITNESSES:
R. D. Hawkins
M. C. Buck.

INVENTOR.
Abraham Amanns
BY V. H. Lockwood
His ATTORNEY.

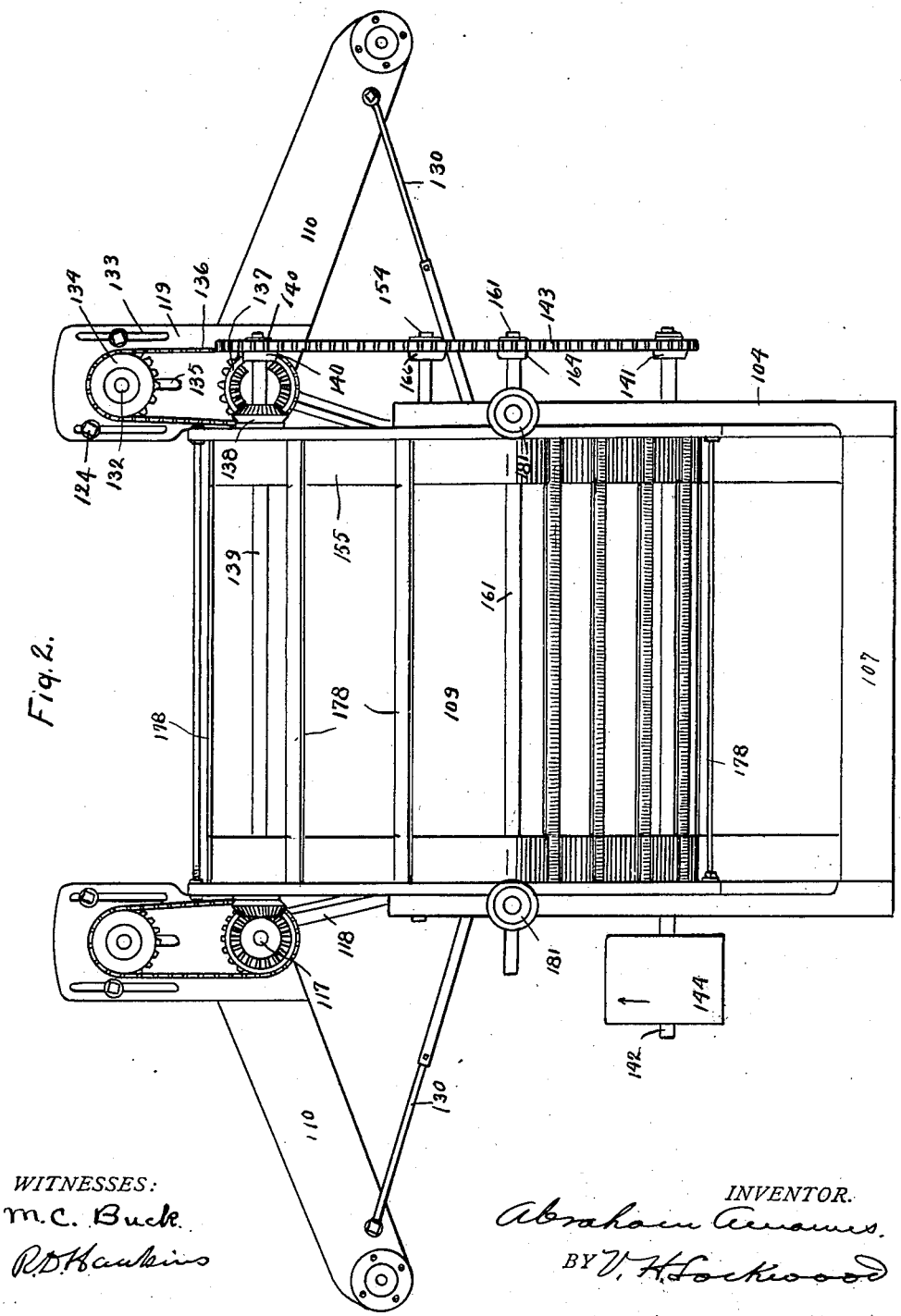

No. 665,716. Patented Jan. 8, 1901.
A. AMANNS.
THRESHING MACHINE.
(Application filed May 6, 1899.)
(No Model.) 7 Sheets—Sheet 3.
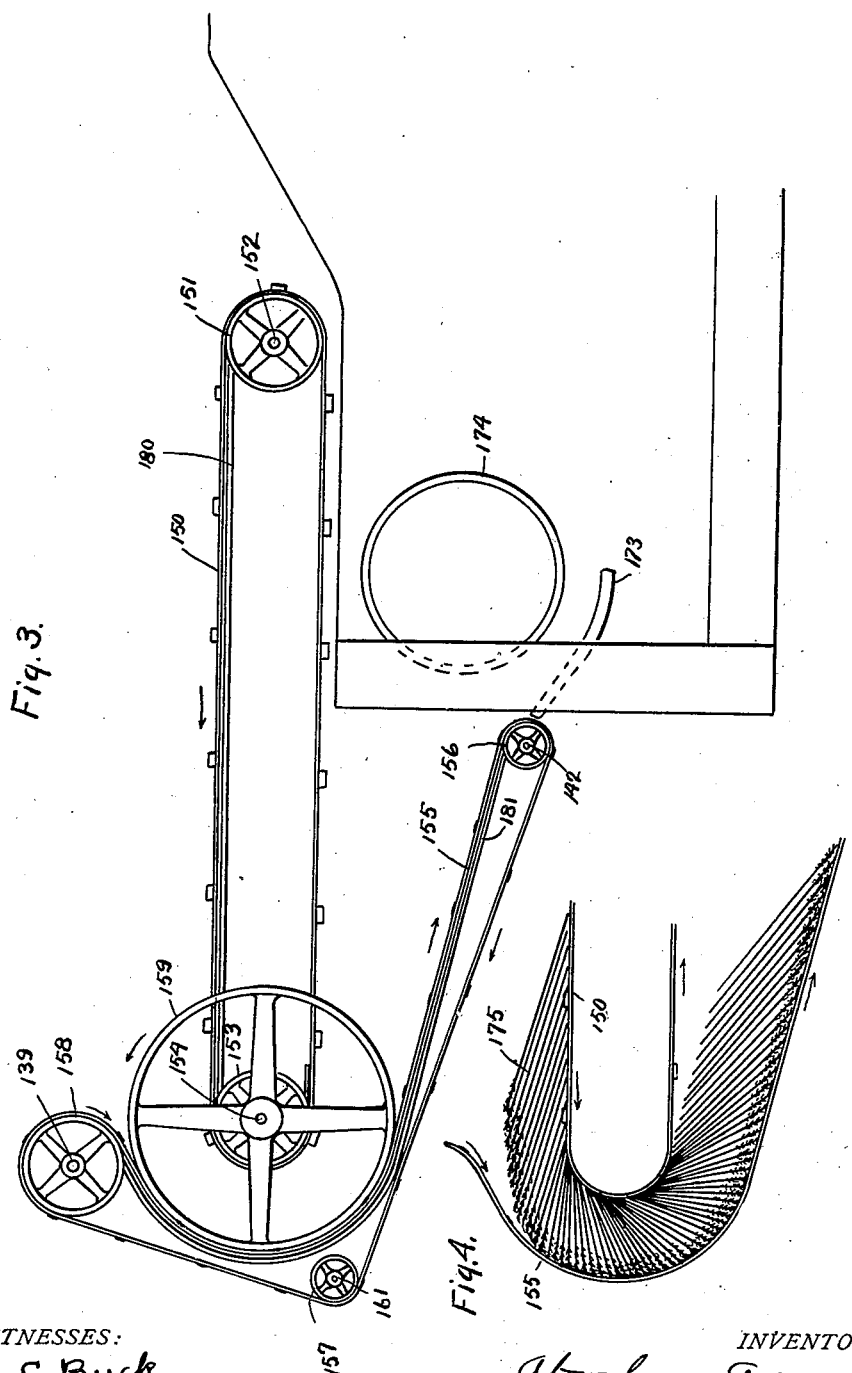
WITNESSES:
M. C. Buck.
R. D. Hawkins
INVENTOR.
Abraham Amanns,
BY V. H. Lockwood
His ATTORNEY.

No. 665,716. Patented Jan. 8, 1901.
A. AMANNS.
THRESHING MACHINE.
(Application filed May 6, 1899.)
(No Model.)
7 Sheets—Sheet 4.
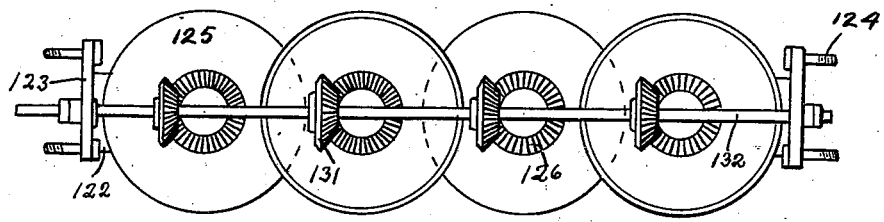
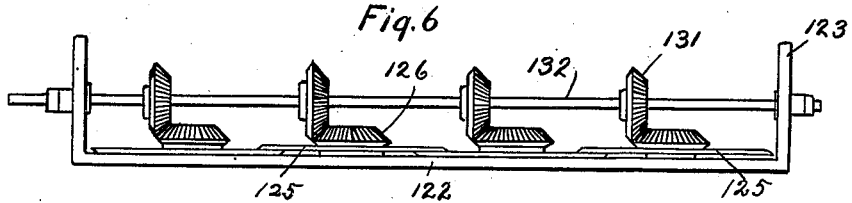
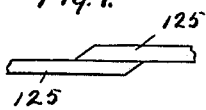
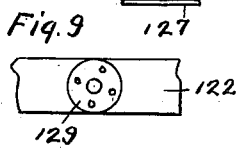
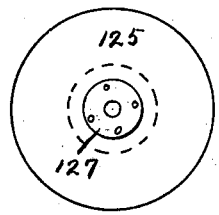
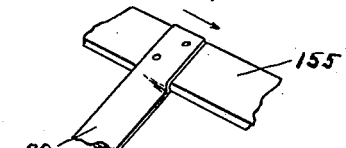
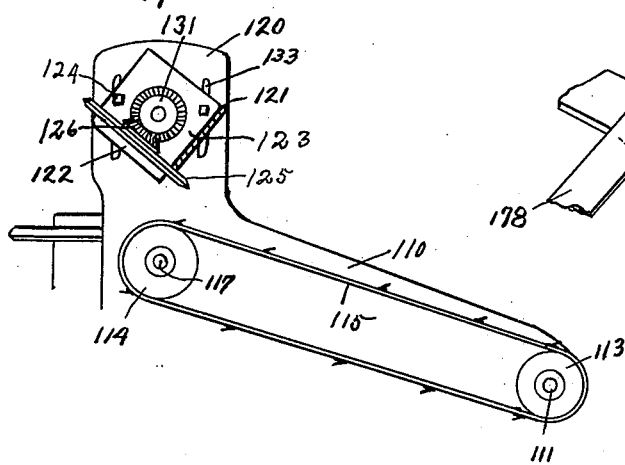
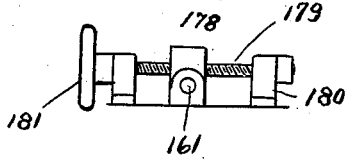
WITNESSES:
M. C. Buck.
R. D. Hawkins
INVENTOR.
Abraham Amanns.
BY V. H. Lockwood
His ATTORNEY.
THE NORRIS PETERS CO., PHOTO-LITHO., WASHINGTON, D. C.

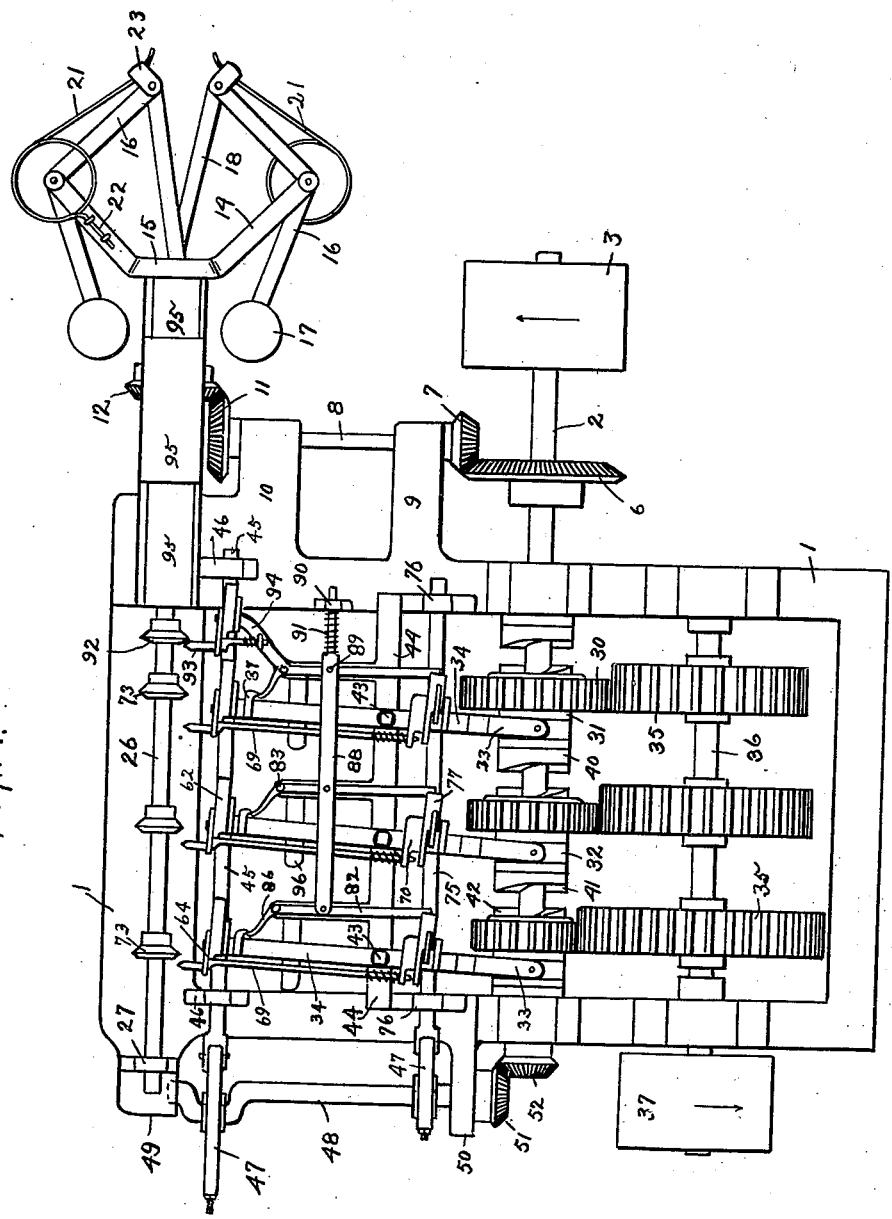

No. 665,716.  
A. AMANNS.  
THRESHING MACHINE.  
(Application filed May 6, 1899.)  
Patented Jan. 8, 1901.
(No Model.)  
7 Sheets—Sheet 6.
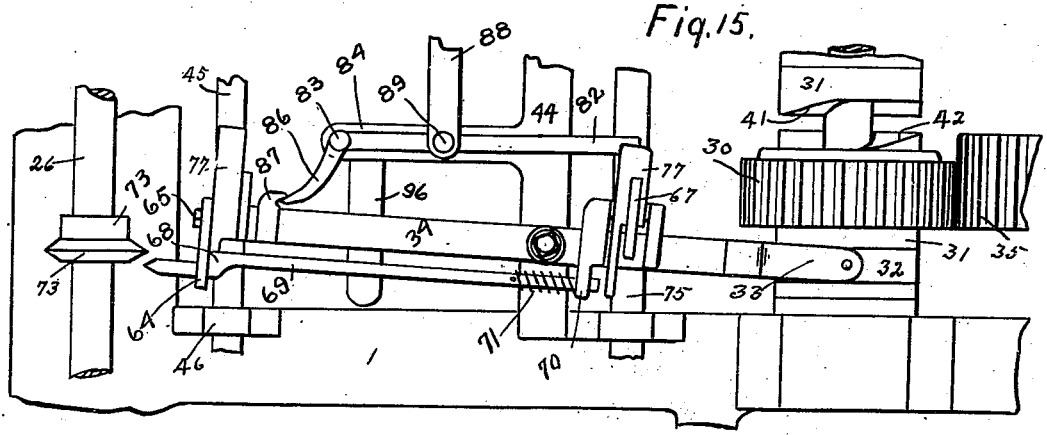
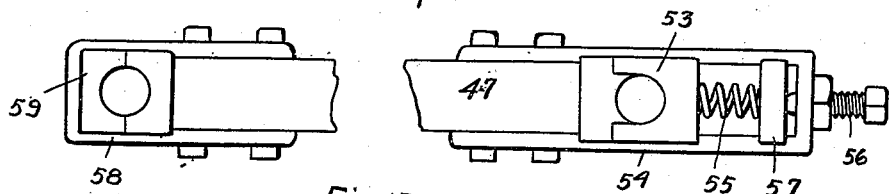
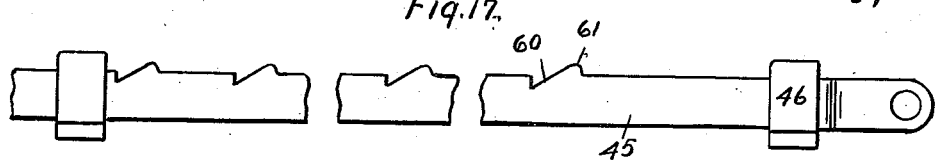
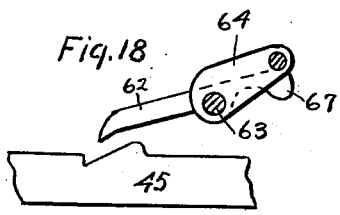 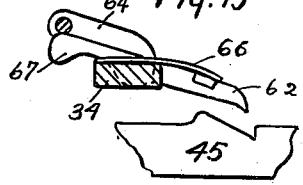
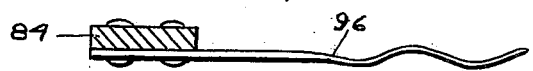
WITNESSES:  
M. C. Buck.  
R. D. Hawkins
INVENTOR.  
Abraham Amanns,  
BY V. H. Lockwood  
His ATTORNEY.
THE NORRIS PETERS CO., PHOTO-LITHO., WASHINGTON, D. C.

No. 665,716. Patented Jan. 8, 1901.
A. AMANNS.
THRESHING MACHINE.
(Application filed May 6, 1899.)
(No Model.) 7 Sheets—Sheet 7.
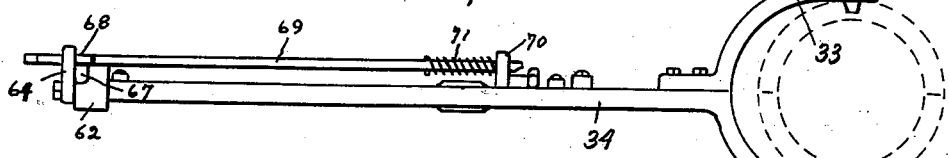
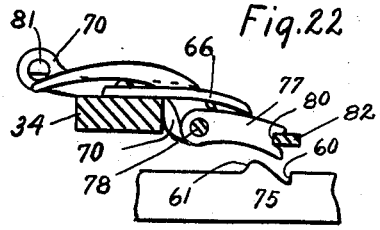
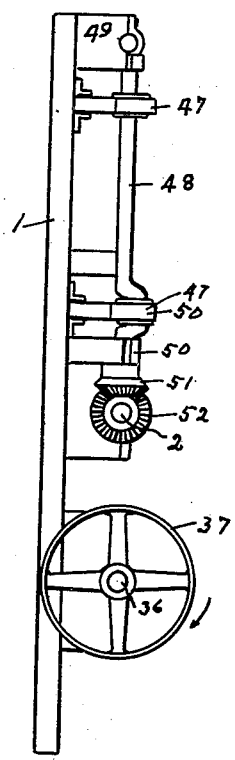
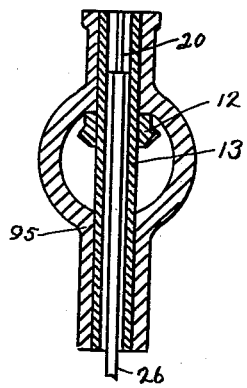
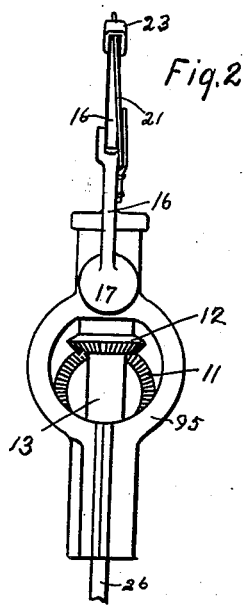
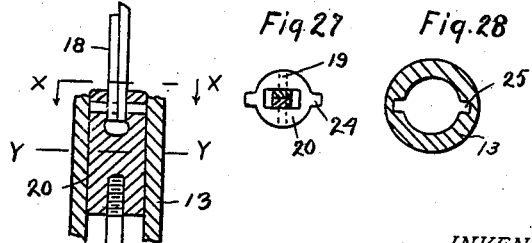
WITNESSES:
M. C. Buck.
R. D. Hawkins
INVENTOR.
Abraham Amanns.
BY V. H. Lockwood.
His ATTORNEY.

UNITED STATES PATENT OFFICE.

ABRAHAM AMANNS, OF GRAMMER, INDIANA, ASSIGNOR OF TWO-THIRDS TO JAMES V. WRIGHT, OF SAME PLACE.

THRESHING-MACHINE.

SPECIFICATION forming part of Letters Patent No. 665,716, dated January 8, 1901.

Application filed May 6, 1899. Serial No. 715,806. (No model.)

*To all whom it may concern:*

Be it known that I, ABRAHAM AMANNS, of Grammer, county of Bartholomew, and State of Indiana, have invented a certain new and useful Threshing-Machine; and I do hereby declare that the following is a full, clear, and exact description thereof, reference being had to the accompanying drawings, in which like characters refer to like parts.

My invention relates to a band-cutter and feeder mechanism for threshing-machines. One object in the feeder is to so convey the wheat to the cylinder as to bring the heads under the overlapping butts of the straw before it reaches the cylinder. This is the essential characteristic of skilful hand-feeding, and so far as I am aware no mechanical feeder has yet been formed that would feed the wheat to the cylinder in the same way or in the same position and manner as when fed by a skilful hand-feeder. With mechanical feeders heretofore the heads are thrown on the platforms and conveyers overlapping and resting upon the butts of the preceding bundle, and it goes in this way to the cylinder, so that the heads of the wheat are brought in direct and immediate contact with the cylinder. This cracks some of the wheat; but the most serious effect is that a considerable portion of the heads pass the cylinder unthreshed. The best method of feeding has been to present the wheat to the cylinder with the heads protected from the cylinder by the butts or the straw, and the purpose of my feeder is to feed the straw in this manner. To that end I provide a conveyer higher than the cylinder that receives the wheat from the side conveyers or platforms. The wheat is thrown on the side conveyers with the butts toward the rear of the machine, and when it is delivered to the next conveyer the heads will overlap the butts. This is the most natural way to throw the wheat. It is then conveyed in that manner in the direction away from the rear of the machine and is turned down on another conveyer that leads to the cylinder, and when it turns down the heads instead of being uppermost will be under the butts and in that manner will be carried to the cylinder.

Another feature of the invention consists in the means for governing the speed of the feeder to suit the speed of the machine, so that the best results in feeding will be attained and the governing of the speed be automatic. One feature of the governing device is that the shifting into and out of gear of the parts is effected by power transmitted from the machine and not from the governor, the governor only setting the parts, and this requires such a small amount of power as not to affect the speed of the governor.

The full nature of my invention will appear from the accompanying drawings and the description and claims following.

In the drawings, Figure 1 is a side elevation of the front part of the threshing-machine, the rear portion and bottom or support not being shown. Fig. 2 is a front elevation of the same with the governing device removed. Fig. 3 is a side elevation of the conveyers, cylinder, and a part of the frame. Fig. 4 is a diagram illustrating the movement of the wheat as it is turned toward the cylinder. Figs. 5 and 6 are details of the mounting of the band-cutting knives. Fig. 7 is a diagram showing the overlapping and engaging edges of a pair of the knives. Fig. 8 is a detail of the bearing for the knives. Fig. 9 is a detail of the means of securing said bearing in place. Fig. 10 is a side view of the knife and bearing. Fig. 11 is a cross vertical section of the means for mounting the knives and with a side conveyer leading thereto. Fig. 12 is a detail of the union of the belts and slats in the conveyer that leads to the cylinder. Fig. 13 is a detail of the tension device for tightening the conveyer that leads to the cylinder. Fig. 14 is a front elevation of the device for regulating the speed of the band-cutter and feeder. Fig. 15 is a front elevation of one of the sections of the regulating device, enlarged and the parts connected with it broken away. Fig. 16 is a plan of the connecting-bar between the driving-crank and the bar that sets the mechanism in gear, the central part being broken away. Fig. 17 is a plan of the bar that throws the mechanism into gear, central portions thereof being cut away. Fig. 18 is a plan of the bar throwing the mechanism into gear and the pawl that engages therewith. Fig. 19 is the same as Fig. 18 looking at it from the opposite side. Fig. 20 is a plan of the spring that bears against and holds in place the switch-lever, the part with which it is connected being in section. Fig. 21 is a side elevation of the shifting-lever with the parts attached thereto. Fig. 22 is a plan of a portion of the bar and the pawl for connecting the same to the mechanism to which it is connected. Fig. 23 is a left side elevation of Fig. 20. Fig. 24 is a central horizontal longitudinal section of the means for mounting the governor. Fig. 25 is a plan of the governor. Fig. 26 is a central longitudinal section of the means for connecting the governor and stem. Fig. 27 is a section on the line X X of Fig. 26. Fig. 28 is a section on the line Y Y of Fig. 26.

I show the front part 100 of a threshing-machine the frame of which is formed of the lower horizontal pieces 101, the uprights 102, the forwardly-extending pieces 103 on each side of the mouth of the machine, and the braces or oblique pieces 104, all of which appear in Fig. 1. As shown in Fig. 2, there are cross-pieces 107 connecting the uprights 102. The front part of the frame is closed in with the side boards 108 and a suitable bottom 109 provided for that part of the frame to form the mouth or throat of the machine into which the unthreshed material is introduced.

The wheat is first thrown upon side conveyers formed of end boards 110, that carry the horizontal shaft 111, which is provided with the roller 113. Over this roller and the roller 114 on the shaft 117 the conveyer operates. The conveyer is formed of the belts 115 and the cross-slats 116, as appears in Figs. 1 and 11. The conveyer is pivotally mounted on the shaft 117, that is supported by the braces 118, secured to each side of the frame, as appears in Figs. 1 and 2. Two uprights 119 and 120 are secured to the side boards 110 of the side conveyers, as appears in Figs. 2 and 11. The upper part of these boards are connected by the cross-boards 121, which keep the straw from the knives and gears, as appears in Figs. 1 and 11. Between and to the upright bars 119 and 120 I secure the frame shown in Fig. 6, consisting of a main plate 122, with end pieces 123, the latter being secured to the uprights by the bolts 124. On the plate 122 I mount a series of disk knives 125. Each knife is provided with the bevel-gear 126, secured to it on one side. To the plate 122 I secure a bearing-plate 127 with a bearing pin or spindle 128, on which the knives and bevel-gears 126 operate. These knives are so placed as to overlap each other, as appears in Fig. 6. Their cutting edge is formed by beveling and the edges of the adjacent knives are beveled in opposite directions, as appears in Fig. 7, so that the cutting edge of the two adjacent knives will cut together and coöperate in cutting the bands. The plate 122, upon which the knives are mounted, is set in relation to the side conveyers at a rather acute angle, as appears in Fig. 11. The purpose of this is to cause the knife to be in the path of the bundle as it moves up on the conveyer, and with the plane of the knives varying at a slight angle from the plane of the conveyer and the line of direction of the movement of the bundle the bundle cannot escape engagement with the knives and cannot pass beneath the knives without being cut. Furthermore, the knives in this position will not engage the top of the band, but will cut the band at the approaching side of the bundle, and a portion of the straw in the bundle after the band is cut will catch on the knives and not pass into the mouth of the machine until the remainder of the straw in the bundle has been discharged by the conveyer. In other words, these knives in the position stated distribute the straw in the bundles immediately after the band is cut, so that the whole body of the straw in the bundle does not pass together through the machine, but is scattered and distributed rather evenly. By arranging the series of knives as shown no bundles can pass through the conveyers without the bands being cut. The side conveyers are conveyed upwardly, as shown, for a purpose that will hereinafter appear, and the outer ends thereof are supported by the adjustable braces 130. The position of the knives is vertically adjusted by the bolts 124 being secured in the slots 133.

The knives are driven by means of the bevel-gears 131, mounted on the shaft 132, whose ends extend through the end pieces 123 and are adjustably mounted in the slots 135, as appears in Figs. 5, 6, and 11. On the front end of the shaft 132 a sprocket-wheel 134 is secured, which the sprocket-chain 136 connects with the sprocket-wheel 137 on the shaft 117. Said sprocket-wheel 137 is provided on one side with the bevel-gear that meshes with the bevel-gears 138 on the shaft 139, mounted in the frame. As appears in Fig. 2, the right end of said shaft 139 carries a sprocket-wheel 140, which is connected with the sprocket-wheel 141 on the shaft 142 below by the sprocket-chain 143. Said shaft 142 is driven by the pulley 144 and it is driven by the belt 38 from the pulley 37 in the governing mechanism, as appears in Figs. 1 and 14. Therefore the band-cutter and feeder mechanism is driven by the regulating mechanism through the pulley 144 and the gear just described.

The side conveyers discharge the straw after the bands have been cut upon the conveyer 150, (shown in Fig. 3,) which is mounted above the front part of the machine, as therein shown, or at least higher than the cylinder, being carried on the pulley 151 on the shaft 152 and the pulley 153, mounted on the shaft 154. This conveyer is mounted in a horizontal position and its front end extends over and discharges into the mouth or throat of the machine, its movement being in the direction indicated by the arrow—that is, the straw thereon is moved in the direction of the arrow and away from the rear of the machine. As the straw is turned down over the front end of the conveyer it is received by the conveyer 155, that runs over the pulleys 156, 157, 158, and 159, said pulleys being mounted on shafts 142, 161, 139, and 154, respectively, that are mounted crosswise in the framework. These various shafts are driven by the sprocket-wheels 141, 164, 140, and 166, respectively, as appears in Fig. 1, said sprocket-wheels being mounted upon the outer and exposed ends of said shafts, and they in turn are driven by a single sprocket-chain 143. The shaft 142 is mounted in the removable bearing 168, secured to the board 169, which is hinged at 170 at one end and is held in place at the other end by the hook 171 and the staple 172. The sprocket-chain 143 is driven by the sprocket-wheel 141 on the shaft 142, which carries the pulley 144, as appears in Figs. 1 and 2 and has been heretofore explained. The conveyers 150 and 155 have suitable bottoms 180 and 181. From the foregoing description the method of mounting and actuating the two conveyers 150 and 151 will be understood. The latter conveyer 155 extends into the very throat of the machine adjacent to the throat-piece 173 and close to the cylinder 174. The wheat is thrown on the side conveyers with the butts toward the rear of the machine. The straw will be discharged upon the conveyer 150 with the butts still toward the rear of the machine, and then the straw will be conveyed head first away from the rear of the machine. The heads in this parts of the operation will overlap the butts. When the straw approaches the discharge end of the conveyer 150, it assumes the position shown in the diagram in Fig. 4, 175 representing the straw, and the heads are engaged by the conveyer 155 and turned downward, as therein shown. This last conveyer moves in a direction the reverse of that of the conveyer 150 and in this way the heads are placed beneath and the butts overlap, as shown in said diagram. The grain approaches the cylinder in this position with the heads thoroughly protected from the violent action of the cylinder and yet in position to receive that beating and action which successfully beats out the grains of wheat without cracking them. In this way the grain is fed to the cylinder in the form that is considered by far preferable by all skilled hand-feeders.

The conveyer 155 is formed as shown in Fig. 12, consisting of flexible endless bands 176 and slats 177, that are turned down on the forward side, as therein shown, the purpose being to use a metallic slat, so that it will be thin enough to cause the belt 177 to hug the pulley 159 so closely as to prevent straw from coming between the two and at the same time enable the slat to properly engage the straw in conveying the same, at least better than if it were straight and thin. The shaft 161 is mounted on the outer end of the forwardly-extending pieces 103 of the frame, so as to be adjustable in order to tighten the chain 143 and conveyer 155. Therefore said shaft 161 is mounted in the bearing-blocks 178, that are mounted on the screw 179, which operates in the posts 180 and is turned by the hand-wheel 181, said posts 180 being mounted on the piece 103 of the frame.

The device for regulating the speed of the band-cutter and feeder consists of a frame 1, connected with the front portion of the frame of the threshing-machine in any suitable manner, the connection here being with the braces 104. The frame 1 is hinged at its upper end to said braces by hinges 105 and is secured at its lower end by the hooks 106. I mount a shaft 2 horizontally about midway in said frame 1, and on one end secure a pulley 3, which is driven by the belt 4 from the pulley 5, mounted on the cylinder-shaft of the threshing-machine, as appears in Fig. 1. On said shaft 2 I secure the bevel-gear 6, that engages and drives the bevel-pinion 7, mounted on the lower end of the shaft 8, which is vertically mounted in the two arms 9 and 10, that extend laterally to the right hand from the frame 1. Said shaft 8 carries on its upper end the bevel-gear 11, that engages and drives the bevel-gear 12, which is secured tightly on the tube 13, whereby said tube is rotated. To one end of said tube 13 the governor-arms 14 are secured by the integral band 15, said arms extending laterally at an inclination in opposite directions. In the outer ends of said arms 14 I pivot the levers 16. Said levers are bent or turned at a central point, so that the two parts thereto extend at an angle slightly greater than a right angle. At this bend said levers 16 are pivoted to the arms 14. On one end of said levers 16 the balls 17 are secured that spread under the influence of centrifugal motion. To the other end of said levers 16 I pivotally connect the reciprocating bars 18, that extend to the end of the tube 13 and are pivotally connected by a pin 19 (shown in dotted lines in Fig. 27) to a sliding block or head 20. The coiled spring 21, with one end fastened at 22 to the arms 14 and the other end fastened to the straps 23, that connect the levers 16 with the bars 18, tends to return the governor to normal position and to resist the centrifugal force of the governor-balls when the machine is in operation. The block or head 20 is provided on opposite sides with guide-lugs 24, that reciprocate in the guideways 25, that extend longitudinally in the inner surface of the tube 13. To said sliding block or head 20 I secure the stem 26. The other end of the stem slides through the bracket 27. (Seen in Fig. 1.) On the shaft 2 a series of spur-wheels 30 are loosely mounted, and each has a collar 31, provided with the annular recess or groove 32, in which the fork 33 on the end of the shifting-lever 34 operates. Said spur-wheels 30 engage with the spur-wheels 35, rigidly mounted on the crank-shaft 36, which carries on one end a pulley 37. From said pulley 37 a belt 38 extends to the pulley 144 on the shaft 142 of the feeder, whereby the feeder is driven. (Shown in dotted lines in Fig. 1 and plain in Fig. 2.)

Rigidly secured to the shaft 2 are a series of clutches 40 with ratchet-faces, there being one of said clutches for each wheel. The ratchet-face of the clutch has two or more teeth 41 on it facing a corresponding ratchet-face of the hub of the spur-wheel 30, the ratchet-face in said wheel-hub being provided with two or more ratchet-teeth 42. The teeth 41 and 42 face in opposite directions. It is obvious that when the spur-wheels 30 are moved laterally by the operation of the shifting-lever 34 they will be locked to the clutches and made rotative. The width of the gears 35 is sufficient to permit this lateral play of the gears 30.

It is observed that the diameters of the spur-wheels 30 vary—that is, decrease or increase from one end to the other of the series regularly, as shown. Also the same variation is observed in the diameters of the spur-gears 35, so that a smaller spur-wheel 30 will mesh with the larger spur-wheel 35, and vice versa. A connection is provided between the governor-stem and the various shifting-levers 34, so as to throw these gears 30 into operation one at a time and one after the other, if the speed becomes great enough, beginning first with the smallest gear 30 and then throwing the remainder of the series into gear in the order of their diameters. It is obvious, therefore, that when the smallest gear 30 is thrown into gear it operates the largest gear 35 and starts the feeder at a slow speed. As the governor-stem 36 is further shifted by the governor the smallest gear 30 is thrown out of gear and the next larger one in the series thrown into gear with its corresponding smaller gear 35, which increases the speed of the feeder. This may be continued until the largest gear 30 is thrown into gear with the smallest gear 35 and the others thrown out. Then the feeder will have its highest speed.

The connection between the governor-stem and the shifting-levers 34 will now be described; but an important invention is embodied in the construction whereby the governor does not actuate the mechanism employed in shifting the gears 30 into engagement with the clutches, but this function is performed by power supplied from the driving-shaft 2. The levers 34, that shift the gears 30 into engagement with their clutches, are pivoted intermediate their ends 43 to the cross-bar 44. Said levers are actuated at their upper ends by the sliding bar 45 and an intermediate connection. Said bar 45 slides longitudinally in the brackets 46 and is actuated by the connecting-bar 47, which is driven by the crank-shaft 48, whose upper end is mounted in the extension 49 from the frame 1 and whose lower end is mounted in the extension 50 therefrom. At the lower end of the shaft 48 a bevel-gear 51 is secured that engages the bevel-gear 52 on the end of the shaft 2, whereby said shaft 48 is actuated. The crank-shaft extends through the box 53, that slides in the stirrup 54 and is spring-pressed by the spring 55, whose tension is adjusted by the set screw or bolt 56, which operates through the end of the stirrup against a sliding plate 57. This attachment is important in order to insure accurate operation of the shifting-levers 34. The other end of the connecting-bar 47 has a stirrup 58, that incloses a box 59, to which the end of the sliding bar 45 is secured by a suitable pin or other positive connecting means. The sliding bar 45 has on its front edge a series of notches 60 and lugs 61, associated as shown in Fig. 17. These form on one side of said lugs a long inclined face and on the other side a short inclined face. The connection between said sliding bar 45 and the upper ends of the shifting-lever 34 consists of a pawl mechanism, as shown in Figs. 18 and 19. A suitable pawl 62 is pivotally connected to the upper end of the shifting-lever 34, as shown in Fig. 18. There the upper end of the shifting-lever is cut away, so as to leave the upwardly-extending pin 63 integrally connected with the main body of the lever 34, and on this pin 63 the pawl is pivoted. Above the pawl a plate 64 is mounted on said pin 63 and held by a nut 65. (Shown in Fig. 15.) Said pawl 62 is spring-pressed by the flat spring 66, that is secured to the side of the lever 34, as shown in Fig. 19. The pawls 62 have rearwardly-extending shanks or heels 67, that are held down by the shoulders 68 in the bend of the rods 69, that are so mounted as to be longitudinally movable in the plates 64 at one end and at the other end in the arms 70. A spiral spring 71 tends to push said rod upward, and its upward movement is stopped by the said shoulder 68 bearing against the plate 64, and in that position the shoulder 68 presses against the shank of the pawl 62, when the point of the pawl rides over the top of the lug 61, and it holds the pawl out of engagement with the sliding bar 45, as seen in Figs. 15 and 16. The upper end of the bar 69 is beveled both ways, as shown in Fig. 15. Upon the governor-stem 26 are secured a series of collars 73, their periphery being provided with a double bevel adapted to engage the beveled upper end of the rods 69 and force said rods downward. There is one of these actuating-collars 73 for each of said rods 69. The operation, therefore, for throwing the spur-wheel 30 into gear is as follows: The speed of the machine rotates the governor sufficiently fast to cause it to force the stem 26 to the left, and the left collar 73 engages the upper end of the left rod 69 and forces said rod down until its shoulder 68 escapes from the shank of the pawl 62, whereupon the spring 67 will force the pawl into the notch 60 of the sliding bar 45. Said sliding bar is constantly reciprocated by the means heretofore shown, and when a particular pawl—as, for example, the left pawl—engages it and said sliding bar is moved to the left, as shown in Fig. 14, the upper end of the shifting-lever 34 is moved to the left and the lower end or forked end of said lever shifts the left-hand gear 30 to the right into locking engagement with the clutch, whereupon motion is transmitted to it and the engaging gear 35 and feeder. A reverse movement of the sliding bar 45, by reason of the lug 61, elevates the engaging end of the pawl 62, and when the collar 73 passes the upper end of the rod 69 said rod is pressed upward at once by the spring 71 and its shoulder 68 engages the shank 67 of the pawl 62 and holds it out of engagement with the sliding bar 45. The gears 30 and 35 when started, as explained, are maintained in operation until they are thrown out of gear by the operation of another part of the mechanism. It is observed that the collars 73 are so placed on the governor-stem 26 with relation to the upper end of the various rods 69 that only one of said collars will engage a rod at a time, and after the stem is moved so far as to cause one collar to pass its corresponding rod 69 and continue to move forward the next collar will engage its corresponding rod 69, and so on in series.

The means for throwing the mechanism out of gear is as follows: A reciprocating bar 75 is mounted in the frame under the straps 76 and is reciprocated by the crank-shaft 48. This bar 75 is of the same form and character as the bar 45. The crank to which it is connected is so placed with relation to the crank to which the bar 45 is connected that the unlocking or throwing out of gear will be sure to precede the locking or throwing in gear, so that the former crank is about seventy-two degrees in advance of the other crank. Said bar 75 has the notches 60 and the lug 61, like the bar 45. These notches are engaged by pawls 77, mounted between their ends on the pivot-pin 78, formed on the bracket 70, secured to the shifting-lever 34. The spring 66 is secured and acts in the same way on the pawl 77 as that shown in connection with the pawl 62. The pawl 77 has, besides the point to engage the notch 60, a notch 80 in its face, and at the other end is pressed by the lower end of the rod 69 when it is pulled down through the eye 81 of the bracket 70. This disengages the pawl 77 from bar 75, and it is held out of engagement by the lever 82, that is pivoted at 83 to an extension 84 from the frame-bar 85 and has on its upper end an arm 86, that engages a hook-bar 87, secured to the shifting-lever 34 near its upper end. When said shifting-lever is operated to throw the wheels 30 and 35 into gear, its upper end is moved to the left, and when said movement occurs the inclined face of the hook 87 engages the arm 86, moving it back and downward somewhat, and thereby throws the lower end of the bar 82 to the right and out of engagement with the pawl 77. This construction is repeated for each series of wheels, and the whole series of bars 82 are connected to a bar 88 at the pivotal points 89. The result of this construction is that when one pawl and its corresponding wheel 30 are thrown out of gear all pawls are thrown out of engagement. At the right-hand end the bar 88 is slidably mounted in the strap 90 and is actuated toward the left by a spring 91. By reason of this construction when any one of the pawls 77 is elevated the spring 91, acting through the bar 88, will throw the proper lever 82 into engagement with the elevated pawl.

From the foregoing description it is plain that when the governor-stem through its appropriate collar actuates one of the rods 69, and therefore throws its pawl and its corresponding spur-wheel into gear, all of the pawls 77 will be released and engage the sliding bar 75, and thereby throw out of gear the corresponding spur-wheels 30, excepting the pawl 77, that is held up in inoperative position by the lower end of the rod 69, that has been actuated. Therefore when any spur-wheel is thrown into gear all the others will be thrown out of gear.

In order to throw the whole set out of gear, I provide on the governor-stem 26 an extra collar 92, formed substantially like the collars 73, adapted to engage the short vertical rod 93, which is formed like the upper end of the rods 69 and is associated with the same kind of pawl mechanism. The pawl in this case is mounted upon an arm 94, connected with the right-hand lever 82. This throws all of the mechanism out of gear, as it acts on all of the pawls 77, and there is nothing to hold any of said levers out of engagement with the sliding bar 75, and therefore when said bar is moved to the left the wheels 30 are moved to the left out of engagement with the clutches.

Attention is called to the fact that the governor-stem 26 rotates as the tube 13 rotates, and the rotation of the actuating-collar 73 causes them all the more readily to actuate the rod 69. It is also observed that the means for actuating these shifting-levers 34 is driven from the power-shaft 2 through the crank-shaft 48 and not by the governor. The governor therefore does not lose any of its power, nor is its operation in the movement of the shifting-levers affected. The governor merely releases the pawls, for which but slight power is necessary, and the remainder of the work is done by the power from the shaft 2 through the crank-shaft 48. This is to overcome the difficulty heretofore existing in machines where the governor was made to actuate the shifting-belt or shifting-lever, for frequently the governor will not have the power required to effect such actuation or shifting. Furthermore, if it is desired not to use any certain set of the spurs 30 and 35, by changing the location of the actuating-collar 75 on the governor-stem such wheels would become inoperative, as there would be no means for throwing them into gear with the driving-shaft 2.

In order to hold the shifting-levers 34 wherever they are placed, I provide flat wavy springs 96, secured on the rear side of the bars 84 and extending crosswise immediately behind the levers 34, so that the free ends of said springs will bear against the levers. The spring is formed with two curves or depressions, in which the lever will rest or fit in its two positions. They will prevent the levers from moving unless positively actuated.

What I claim as my invention, and desire to secure by Letters Patent, is—

1. In a threshing-machine a horizontal flat conveyer leading from the rear toward the front of the machine, means for cutting the bands of the bundles before the latter are delivered to said conveyer, and a second conveyer to receive the grain from the horizontal conveyer and that moves in an opposite direction to the cylinder.

2. In a threshing-machine, a horizontal conveyer above the mouth of the thresher, means for driving it forward, another conveyer in the mouth of the thresher with an end curved up in front of the upper conveyer and so placed as to receive the heads of the grain before the butts leave the other conveyer, and means for driving the lower conveyer rearward toward the cylinder.

3. In a threshing-machine, a horizontal conveyer above the mouth of the thresher, means for driving it forward, another conveyer leading into the mouth of the thresher with the outer end curved in front of the upper conveyer so as to be concentric with the forward end of the upper conveyer, and means for driving the lower conveyer downward and rearward toward the cylinder.

4. In a threshing-machine, the drums 151 and 152, the conveyer 150 mounted thereon above the mouth of the machine, the drum 159 mounted on the same shaft as the drum 153, the drums 156, 157 and 158 mounted as shown, the conveyer 155 carried on said drums, and means connected with the driving mechanism of the machine for driving one of said drums.

5. In a threshing-machine, a horizontal conveyer mounted above the mouth of the thresher, means for driving it forward, another conveyer in the mouth of the thresher with the end curved up in front of and adjacent to the upper conveyer, means for driving the lower conveyer rearward toward the cylinder of the machine, and side conveyers carried on frames so mounted as to move the grain and deposit the same on the upper conveyer.

6. In a threshing-machine, side conveyers leading to the machine, a plate extending across and above said conveyer and so mounted as to be vertically adjustable, sharp-edged disks rotatably mounted in the side of said plate in parallel planes with their cutting edges overlapping each other, said plate being so mounted as to hold said knives at an acute angle to the conveyers and close enough to engage the bands of the bundles, bevel-gears centrally secured to said disks, a counter-shaft parallel to said plate, bevel-gears secured thereon to mesh with the bevel-gears on the disks, and means for driving said counter-shaft and the conveyers.

7. In a threshing-machine, side conveyers for the bundles of grain leading to the machine, upright pieces oppositely located at each side of the inner end of said conveyer and each provided with three vertical slots, a plate extending between said uprights with its ends turned at a right angle to them, bolts extending through said end portions and the slots in the uprights for mounting said plate, sharp-edged disks rotatably mounted on said plate with the cutting edges overlapping, bevel-gears secured to the center of said disks, a counter-shaft mounted in the turned ends of said plate so as to be parallel with said plate, bevel-gears on said counter-shaft that mesh with the bevel-gears on the disks, and a common means for driving said counter-shaft and the conveyer.

8. In a threshing-machine, the combination with a band-cutter and feeder, of gears for driving the same possessing varying speed capacity and arranged in series according to their speed capacity, means actuated by power from the threshing-machine for throwing said gears into and out of operation in the order of their speed capacity, a centrifugal governor actuated by power from the cylinder-shaft of the threshing-machine, and means actuated by the governor for throwing the said gear-throwing means into and out of operation.

9. In a threshing-machine, the combination with the band-cutter and feeder, of sets of gears for driving the same, each set consisting of two gears, said sets of gears being of such varying diameters as to possess varying speed capacity and said sets of gears arranged in series according to their speed capacity, means actuated by power from the threshing-machine for throwing said gears into and out of operation in the order of their speed capacity, a centrifugal governor actuated by power from the cylinder-shaft of the threshing-machine, and means actuated by the governor for throwing the said gear-throwing means into and out of operation.

10. In a threshing-machine the combination with the band-cutter and feeder, of a regulating and driving mechanism consisting of a suitable frame, a shaft to which power is transmitted from the threshing-machine, a series of gears mounted on said shaft varying regularly in diameter, a counter-shaft carrying a series of gears that vary in diameter inversely to the variation in diameters of the driving-gears, means for transmitting power from said counter-shaft to the band-cutter and feeder, means actuated by power from said driving-shaft for throwing the driving-gears into and out of operative connection with said driving-shaft in the order of their speed capacity, a centrifugal governor actuated by power from the cylinder-shaft of the threshing-machine, and means actuated by the governor for throwing said gear-throwing means into and out of operation.

11. In a threshing-machine the combination with the band-cutter and feeder, of a regulating mechanism consisting of a suitable frame, a driving-shaft mounted therein that receives power from the threshing-machine, a series of gears of varying diameters loosely mounted on said driving-shaft, a series of corresponding clutches rigidly mounted on said shaft which transmit motion to said gears when brought together, means for transmitting motion from said driving-gears to the band-cutter and feeder, shifting-bars pivotally mounted in the framework and adapted when operated to throw said gears into engagement with their clutches in the order of their diameters beginning with the smallest, a reciprocating notched bar mounted in the framework, means for reciprocating said bar by power from said driving-shaft, a pawl mechanism connected with the ends of the shifting-levers adapted to engage the notches in the reciprocating bar whereby the shifting-levers will be actuated, a centrifugal governor actuated by power from the cylinder-shaft of the threshing-machine, and means actuated by the governor for causing the engagement and disengagement of said pawls with the reciprocating bar.

12. In a threshing-machine, the combination with the band-cutter and feeder, of a regulating mechanism consisting of a suitable frame, a driving-shaft mounted therein that receives power from the threshing-machine, a series of gears of varying diameters loosely mounted on said driving-shaft, a series of corresponding clutches rigidly mounted on said shaft which transmit motion to said gears when brought together, means for transmitting motion from said driving-gears to the band-cutter and feeder, shifting-bars pivotally mounted in the framework and adapted when operated to throw said gears into engagement with their clutches in the order of their diameters beginning with the smallest, a reciprocating notched bar mounted in the framework, means for reciprocating said bars by power from said driving-shaft, a pawl mechanism connected with the ends of the shifting-levers adapted to engage the notches in the reciprocating bar whereby the shifting-levers will be actuated, a centrifugal governor actuated by power from the cylinder-shaft of the threshing-machine, a suitable stem longitudinally movable by said governor, bevel-faced collars mounted on said stem, a series of plungers mounted in connection with the shifting-levers and adapted when not actuated to hold the pawls out of engagement with the reciprocating bar and when actuated release said pawls and with their ends extending so that they will be engaged and actuated by the collars on the governor-stem as they are moved laterally, said collars being so placed that only one plunger will be actuated at a time.

13. In a threshing-machine, the combination with the band-cutter and feeder, of a regulating mechanism consisting of a suitable frame, a driving-shaft mounted therein that receives power from the threshing-machine, a series of gears of varying diameters loosely mounted on said driving-shaft, a series of corresponding clutches rigidly mounted on said shaft which transmit motion to said gears when brought together, means for transmitting motion from said driving-gears to the band-cutter and feeder, shifting-bars pivotally mounted in the framework and adapted when operated to throw said gears into engagement with their clutches in the order of their diameters beginning with the smallest, a reciprocating notched bar mounted in the framework, means for reciprocating said bar by power from said driving-shaft, a pawl mechanism connected with the ends of the shifting-levers adapted to engage the notches in the reciprocating bar whereby the shifting-levers will be actuated, a centrifugal governor actuated by power from the cylinder-shaft of the threshing-machine, a second reciprocating notched bar mounted on the opposite side of the pivotal point of said shifting-levers from the first-named reciprocating bar, means for reciprocating said last-mentioned bar after the first-mentioned bar, a second pawl mechanism mounted on the shifting-bar to engage the last-mentioned reciprocating bar, a lever 82 pivoted between its ends and the framework and adapted to engage said last-mentioned pawl and hold it out of engagement with the reciprocating bar, an arm 86 connected with said lever 82 and an arm 86 secured to the shifting-bar, all in the manner substantially as shown, whereby said gears will be thrown out of operation.

14. In a threshing-machine, the combination with the band-cutter and feeder, of a regulating mechanism consisting of a suitable frame, a driving-shaft mounted therein that receives power from the threshing-machine, a series of gears of varying diameters loosely mounted on said driving-shaft, a series of corresponding clutches rigidly mounted on said shaft which transmit motion to said gears when brought together, means for transmitting motion from said driving-gears to the band-cutter and feeder, shifting-bars pivotally mounted in the framework and adapted when operated to throw said gears into engagement with their clutches in the order of their diameters beginning with the smallest, a reciprocating notched bar mounted in the framework, means for reciprocating said bars by power from said driving-shaft, a pawl mechanism connected with the ends of the shifting-levers adapted to engage the notches in the reciprocating bar whereby the shifting-levers will be actuated, a centrifugal governor actuated by power from the cylinder-shaft of the threshing-machine, a second reciprocating notched bar mounted on the opposite side of the pivotal point of said shifting-levers from the first-named reciprocating bar, means for reciprocating said last-mentioned bar after the first-mentioned bar, a second pawl mechanism mounted on the shifting-bar to engage the last-mentioned reciprocating bar, a lever 82 pivoted between its ends and the framework and adapted to engage said last-mentioned pawl and hold it out of engagement with the reciprocating bar, an arm 86 connected with the lever 82 and an arm 87 secured to the shifting-bar, the pivoted levers 94, the plunger 93, a pawl mechanism on the plunger 93 to engage the reciprocating bar 45, the collar 92 on the governor-stem to actuate the plunger 93 and a spring-controlled bar 88 that pivotally connects all of the ungearing-bars 83 in a series, whereby all of the gears will be thrown out of operation.

In witness whereof I have hereunto affixed my signature in the presence of the witnesses herein named.

ABRAHAM AMANNS.

Witnesses:
H. R. NAY,
CHAS. WERTZ.